United States Patent
Dickinson

(10) Patent No.: US 11,196,707 B2
(45) Date of Patent: Dec. 7, 2021

(54) MANAGING COMMUNICATIONS BETWEEN COMPUTING NODES

(71) Applicant: Amazon Technologies, Inc., Reno, NV (US)

(72) Inventor: Andrew B. Dickinson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 251 days.

(21) Appl. No.: 15/176,015

(22) Filed: Jun. 7, 2016

(65) Prior Publication Data

US 2016/0294770 A1 Oct. 6, 2016

Related U.S. Application Data

(63) Continuation of application No. 12/145,411, filed on Jun. 24, 2008, now Pat. No. 9,369,302.

(51) Int. Cl.
| | | |
|---|---|---|
| *G06F 15/16* | (2006.01) | |
| *H04L 29/12* | (2006.01) | |
| *H04L 12/46* | (2006.01) | |
| *H04L 12/24* | (2006.01) | |

(52) U.S. Cl.
CPC ...... *H04L 61/2503* (2013.01); *H04L 12/4641* (2013.01); *H04L 41/0896* (2013.01)

(58) Field of Classification Search
CPC ............ H04L 61/2503; H04L 61/2514; H04L 61/2575; H04L 29/12009; H04L 29/12528; H04L 29/12537; H04L 61/256; H04L 61/2578; H04L 63/0272
See application file for complete search history.

(56) References Cited

U.S. PATENT DOCUMENTS

| | | | |
|---|---|---|---|
| 6,212,529 B1 | 4/2001 | Boothby et al. | |
| 6,418,476 B1 | 7/2002 | Luciani | |
| 7,020,720 B1 | 3/2006 | Donahue et al. | |
| 7,133,404 B1 | 11/2006 | Alkhatib et al. | |
| 7,154,891 B1 * | 12/2006 | Callon | H04L 29/12009 370/392 |
| 7,181,612 B1 | 2/2007 | Pellacuru et al. | |
| 7,227,872 B1 | 6/2007 | Biswas et al. | |
| 2002/0129165 A1 | 9/2002 | Dingsor et al. | |
| 2002/0141401 A1 * | 10/2002 | Albert | H04L 12/4633 370/389 |

(Continued)

OTHER PUBLICATIONS

"How NAT Works," retrieved Jun. 6, 2008, from http://www.cisco.com/warp/public/556/nat-cisco.shtml, 11 pages.

(Continued)

*Primary Examiner* — Suraj M Joshi
*Assistant Examiner* — Ayele F Woldemariam
(74) *Attorney, Agent, or Firm* — Robert C. Kowert; Kowert, Hood, Munyon, Rankin & Goetzel, P.C.

(57) ABSTRACT

Techniques are described for managing communications sent to and/or from multiple computing nodes, such as for a group of computing nodes that are part of one or more private networks. In at least some situations, the techniques are used in conjunction with providing network address translation ("NAT") functionality to a group of computing nodes that share one or more networks, such as to provide NAT functionality in a distributed and asymmetric manner using multiple computing devices that perform different types of operations at different locations within the private network.

20 Claims, 5 Drawing Sheets

(56) References Cited

U.S. PATENT DOCUMENTS

| | | | |
|---|---|---|---|
| 2003/0018889 A1* | 1/2003 | Burnett | H04L 41/0809 |
| | | | 713/153 |
| 2003/0088787 A1* | 5/2003 | Egevang | H04L 29/125 |
| | | | 726/7 |
| 2003/0106067 A1 | 6/2003 | Hoskins et al. | |
| 2003/0135616 A1 | 7/2003 | Carrico et al. | |
| 2004/0249974 A1* | 12/2004 | Alkhatib | H04L 29/12349 |
| | | | 709/245 |
| 2006/0206687 A1* | 9/2006 | Vega | G06F 12/10 |
| | | | 711/206 |
| 2006/0268890 A1 | 11/2006 | Richardson et al. | |
| 2007/0019540 A1 | 1/2007 | Biswas et al. | |
| 2007/0283028 A1 | 12/2007 | Gilroy et al. | |
| 2008/0059556 A1* | 3/2008 | Greenspan | G06F 9/5077 |
| | | | 709/201 |
| 2008/0134174 A1* | 6/2008 | Sheu | G06F 12/1036 |
| | | | 718/1 |
| 2008/0172493 A1 | 7/2008 | Gray et al. | |
| 2008/0313318 A1* | 12/2008 | Vermeulen | G06F 9/45558 |
| | | | 709/223 |
| 2009/0075698 A1 | 3/2009 | Ding et al. | |
| 2010/0312901 A1* | 12/2010 | Noyranen | H04L 29/12509 |
| | | | 709/228 |

OTHER PUBLICATIONS

"Virtual Server via Direct Routing," retrieved Jun. 24, 2008, from http://www.linuxvirtualserver.org/VS-DRouting.html, 8 pages.
Tsirtsis, G., et al., "NAT Bypass for End 2 End 'sensitive' applications," Jan. 1998, IETF, 5 pages.

* cited by examiner

MANAGING COMMUNICATIONS BETWEEN COMPUTING NODES

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses. Some public data center operators provide network access, power, and secure installation facilities for hardware owned by various customers, while other public data center operators provide "full service" facilities that also include hardware resources made available for use by their customers. However, as the scale and scope of typical data centers and computer networks has increased, the task of provisioning, administering, and managing the associated physical computing resources has become increasingly complicated.

The advent of virtualization technologies for commodity hardware has provided some benefits with respect to managing large-scale computing resources for many customers with diverse needs, allowing various computing resources to be efficiently and securely shared between multiple customers. For example, virtualization technologies such as those provided by VMWare, XEN, or User-Mode Linux may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span one or more physical resources, such as a single virtual machine with multiple virtual processors that actually spans multiple distinct physical computing systems.

DETAILED DESCRIPTION

Techniques are described for managing communications sent to and/or from multiple computing nodes, such as for a group of computing nodes that are part of one or more private networks. In at least some embodiments, the techniques may be used in conjunction with providing network address translation ("NAT") functionality to a group of computing nodes that share one or more networks, such as to allow the computing nodes of the group to use a first group of internal network addresses to inter-communicate with each other over the shared network(s), and to use a second group of one or more other external network addresses for communications between computing nodes of the group and other computing systems that are external to the group. In particular, in at least some embodiments, the described techniques include providing NAT-related functionality in a distributed and asymmetric manner using multiple computing devices that perform different types of operations, as discussed in greater detail below. Furthermore, in at least some embodiments, some or all of the described techniques are automatically performed by embodiments of a Communication Manager module.

Figure 1A:
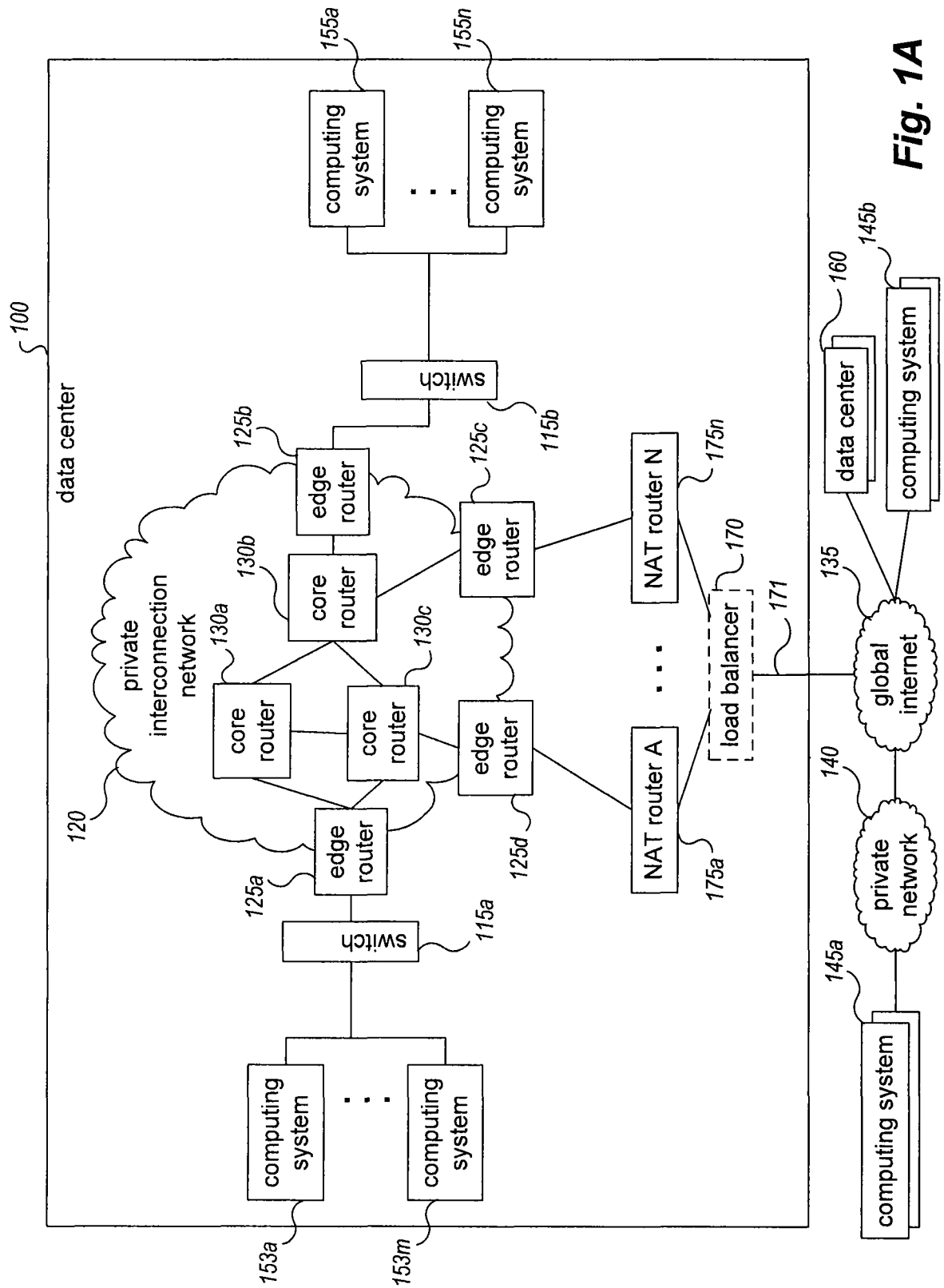
FIGS. 1A and 1B are network diagrams illustrating example embodiments of exchanging communications between various computing nodes.

FIG. 1A illustrates one example of an environment in which conventional NAT functionality may be provided for a group of computing systems that share a common network, which in this example is a private network that includes various computing systems 153 and 155 in a data center 100. In particular, in this example, the private network of the data center 100 is connected to a global internet 135 external to the data center 100, which provides access to one or more computing systems 145a via private network 140, to one or more other globally accessible data centers 160 that each have multiple computing systems, and to one or more other computing systems 145b. The global internet 135 may be, for example, a publicly accessible network of networks, possibly operated by various distinct parties, such as the Internet, and the private network 140 may be, for example, a corporate network that is wholly or partially inaccessible from computing systems external to the private network 140. Computing systems 145b may include, for example, home computing systems that connect directly to the Internet (e.g., via a telephone line, cable modem, a Digital Subscriber Line ("DSL"), etc.).

In addition to the physical computing systems 153a-153m and 155a-155n of the private network, this example data center further includes multiple networking devices, such as switches 115a-115b, edge routers 125a-125d, and core routers 130a-130c. Switch 115a connects physical computing systems 153a-153m to the intermediate interconnection network 120 via edge router 125a, while switch 115b similarly connects physical computing systems 155a-155n to the interconnection network 120 via edge router 125b. The interconnection network 120 connects the local computing systems 153 and 155 to each other as part of the private network, as well as to other external networks (e.g., the global internet 135), and includes the core routers 130a-130c in addition to the edge routers 125a-125d. The core routers 130a-130c manage communications within the interconnection network 120, such as by forwarding packets or other data transmissions or communications as appropriate based on characteristics of such communications (e.g., header information including source and/or destination addresses, protocol identifiers, etc.) and/or the characteristics of the interconnection network 120 itself (e.g., routes based on network topology, etc.). It will be appreciated that, for the sake of simplicity, various aspects of the computing systems and other devices of this example are illustrated without showing various conventional details, that much larger numbers of computing systems and other devices may be inter-connected in similar manners in other embodiments, and that computing systems and other devices may be inter-connected in other manners in other embodiments.

In this example, the computing systems 153 and 155 of the data center 100 are part of a private network, and each may be assigned a private network address (not shown) in accordance with the private network, such as with the private network addresses being unique with respect to the private network but not guaranteed to be unique with respect to other computing systems that are not part of the private network. As one example, Internet Protocol ("IP") and other networking protocols may reserve groups or blocks of network addresses for use with private networks, with such reserved private network addresses not being routable over public networks external to the private network (e.g., IP network addresses 192.168.0.0-192.168.255.255, also referred to as "192.168/16")—in such situations, different private networks may each use the same private network addresses within their private networks, as the private network addresses are locally unique to each private network, but those private network addresses may not be used for communications between a computing system of a private network and another computing system external to the private network. Additional details related to examples of some types of private networks and private network addresses with respect to the Internet Protocol ("IP") networking protocol are available at "Request For Comments 1918—Address Allocation for Private Internets", February 1996, at tools<dot>ietf<dot>org<slash>html<slash>rfc1918 (where <dot> and <slash> are replaced by the corresponding characters with those names), which is hereby incorporated by reference in its entirety; at "Request For Comments 3330—Special-Use IPv4 Addresses", September 2002, at www<dot>ieff<dot>org<slash>rfc<slash>rfc3330.txt; at "Request For Comments 2544—Benchmarking Methodology for Network Interconnect Devices", March 1999, at www<dot>ietf<dot>org<slash>rfc<slash>rfc2544.txt; and at "Request For Comments 5156—Special-Use IPv6 Addresses", April 2008, at www<dot>ieff<dot>org<slash>rfc<slash>rfc5156.txt. In other embodiments, the computing systems 153 and 155 of the data center 100 may instead be part of a common network that internally uses a group of public network addresses or other non-private network addresses, with some or all of those network addresses also being independently used internally by one or more other networks between which communications may occur.

In this example, to facilitate communications between the internal computing systems 153 and 155 of the private network and other external computing systems that are not part of the private network (e.g., computing systems 145*a*, computing systems 145*b*, and/or other computing systems that are part of the data centers 160), one or more NAT router computing devices 175 are further provided, as well as an optional load balancer device 170. In particular, one or more representative public network addresses (not shown) may have previously been assigned for use in representing the private network of the data center 100, such as by the Internet Assigned Numbers Authority ("IANA") or one of multiple Regional Internet Registries ("RIRs"). Such public network addresses are routable over the global internet 135 and other networks, such that a communication that is sent by external computing system 145*b* and that has one of the private network's representative public network addresses as the destination network address for the communication will be routed over the global internet 135 to one of the NAT router devices 175. Depending on the volume of communications passing in and out of the private network, one or more NAT router computing devices may be used, such as with the optional load balancer device 170 used to randomly (or otherwise) assign an incoming communication 171 directed to any of the private network's representative public network addresses to any of multiple NAT router computing devices for handling.

In FIG. 1A, the illustrated NAT router devices 175 operate in a symmetric manner to manage both incoming communications to the private network from external computing systems and outgoing communications from the private network to external computing systems. For example, if internal computing system 153*a* wants to send a communication (not shown) to external computing system 145*b*, internal computing system 153*a* creates an outgoing communication that includes external computing system 145*b*'s public network address as the destination network address for the communication and that includes internal computing system 153*a*'s private network address as the source network address for the communication. The interconnection network 120 then uses the destination network address of the outgoing communication to direct it to one of the NAT router devices 175 for handling. In particular, in order to allow external computing system 145*b* to reply to the outgoing communication, one of the NAT router devices 175 temporarily maps one of the representative public network addresses for the private network to internal computing system 153*a*, and rewrites or otherwise modifies the outgoing communication to replace the private network address for the source network address with the mapped representative public network address. The NAT router device 175 that handled the outgoing communication will then update mapping information for all of the other NAT router devices 175 with the new mapping, and forward the modified outgoing communication to the destination external computing system 145*b* over the global internet 135.

Such temporary mappings may be made in different ways in different situations, such as only for the purposes of communications between internal computing system 153*a* and external computing system 145*b*, for the purposes of communications between computing system 153*a* and any external computing system, etc. Thus, in some embodiments, internal computing system 153*a*'s private network address may be mapped to a first representative public network address for the purpose of communications with a first external computing system, and may be simultaneously mapped to a second representative public network address for the purpose of communications with a distinct second external computing system. In addition, in some embodiments, a mapping may further specify one or more port numbers (e.g., Transmission Control Protocol, or TCP, port numbers), such that a given representative public network address and first port number are mapped to internal computing system 153*a* (e.g., to the internal computing system 153*a*'s private network address and to a third port number that may be the same as or different from the first port number), and such that the same representative public network address and a distinct second port number may be mapped to a different internal computing system (e.g., internal computing system 155*n*).

If external computing system 145*b* later responds to the modified outgoing communication by sending a response incoming communication (not shown) that uses internal computing system 153*a*'s mapped representative public network address as the destination network address for the response incoming communication, the response incoming communication will be directed over the global internet 135 to one of the NAT router devices 175. That NAT router device 175 then performs similar processing in reverse to that previously described for the outgoing communication.

In particular, the NAT router device 175 uses the mapping information to translate the mapped representative public network address into the private network address of internal computing system 153*a*, modifies the destination network address of the response incoming communication from the mapped representative public network address to the private network address of internal computing system 153*a*, and forwards the modified incoming communication to internal computing system 153*a* via the interconnection network 120. In this manner, at least some of the internal computing systems of the private network may inter-communicate with external computing systems via temporary use of the representative public network addresses. Furthermore, in some situations, one or more of the internal computing systems of the private network may each be permanently or otherwise exclusively mapped to use one of the representative public network addresses (e.g., to a unique combination of representative public network address and port number), such that external computing systems may initiate new incoming communications to such an internal computing system by directing those new incoming communications to that mapped representative public network address (and port, if applicable) as the destination network address of those new incoming communications.

While the use of NAT functionality in the manner of that described in FIG. 1A provides some benefits, it also may have drawbacks in some situations. As one example, the NAT router devices 175 may act as a bottleneck that slows or blocks at least some communications, since all incoming communications to the private network and all outgoing communications from the private network may need to pass through and be handled by one of the NAT router devices 175. Furthermore, as the number of representative public network addresses and internal computing systems of the private network grows, the mapping information used by the NAT router devices 175 may grow in a rapid manner, since multiple distinct mapping rules may be needed for each representative public network address and for each internal computing system. If each NAT router device 175 maintains an independent local copy of all of the mapping information for the private network, the size of the mapping information may quickly exceed the storage and/or processing capabilities of the NAT router devices.

Figure 1B:
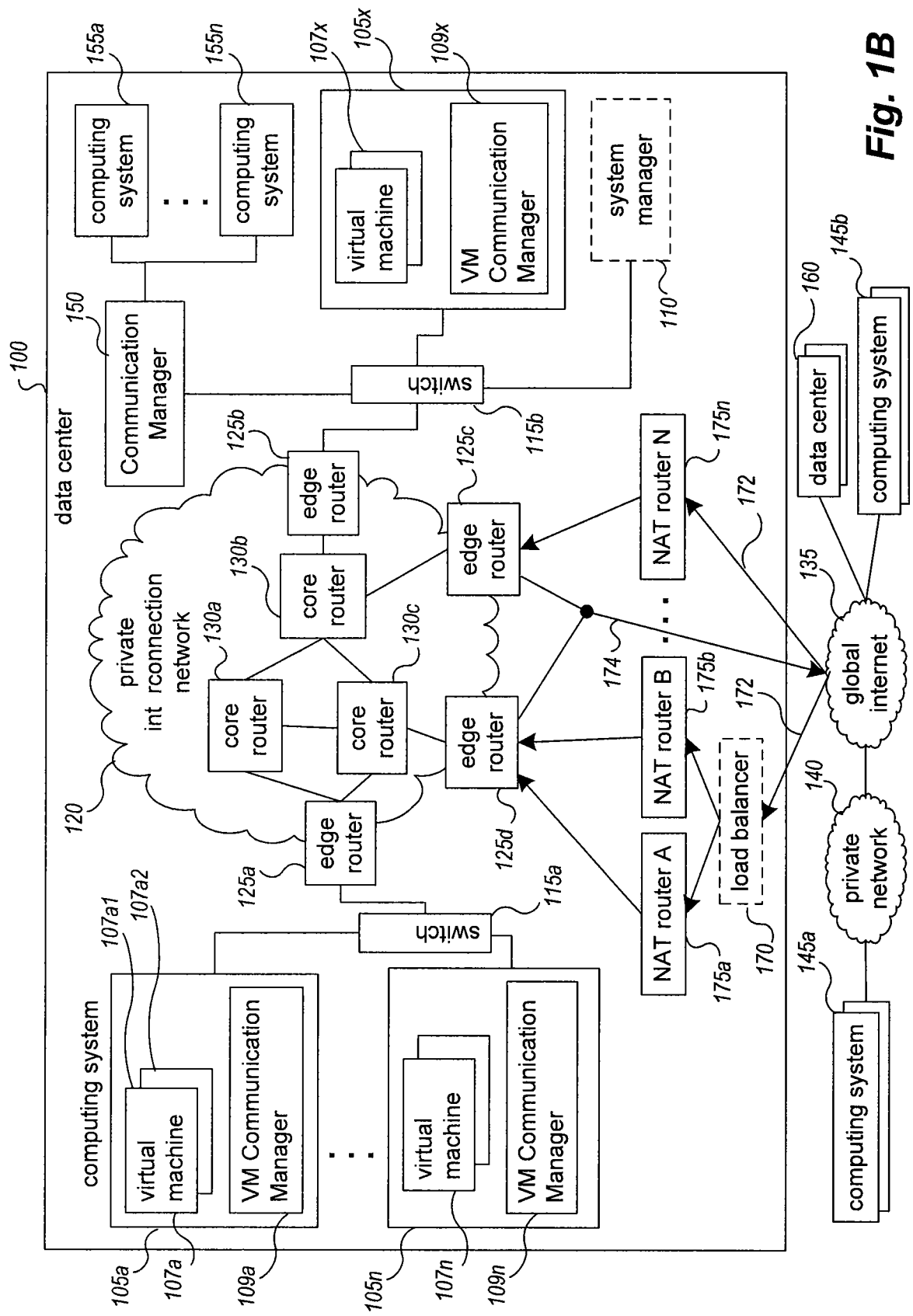

FIG. 1B is a network diagram similar to that of FIG. 1A, but in which additional described techniques are used in conjunction with providing NAT-related functionality. In particular, in the example of FIG. 1B, NAT-related functionality is provided in an asymmetric and distributed manner, such that different devices at different locations within the private network each provide different types of functionality. In this manner, various benefits may be obtained in at least some embodiments, such as minimizing bottlenecks, minimizing the amount of mapping information used by each device, and/or various other benefits. For illustrative purposes, embodiments are described below in which specific types of computing nodes, networks, communications, and configuration operations are performed. These examples are provided for illustrative purposes and are simplified for the sake of brevity, and the inventive techniques can be used in a wide variety of other situations, some of which are discussed below.

In particular, in a manner similar to FIG. 1A, FIG. 1B illustrates a data center 100 that includes an interconnection network 120, and external to the data center are the global internet 135, one or more computing systems 145*a* accessible via private network 140, one or more other globally accessible data centers 160 that each have multiple computing systems, and one or more other computing systems 145*b*. In addition, the example private network within the data center 100 of FIG. 1B includes a number of computing nodes, including computing systems 155*a*-155*n* similar to those of FIG. 1A, although not including computing systems 153*a*-153*m* of FIG. 1A in this example. Furthermore, the example data center 100 of FIG. 1B includes additional host computing systems 105*a*-105*n* and 105*x*, which in this example each host multiple virtual machines 107*a*-107*n* and 107*x* respectively, with each of the virtual machines 107 acting as a distinct computing node of the private network in this example. Thus, each of the virtual machine computing nodes 107 and computing system nodes 155 may be assigned a unique private network address for the private network.

In the example of FIG. 1B, a variety of Communication Manager modules are further provided to assist in managing communications for the private network, such as to provide NAT-related functionality for the private network in conjunction with one or more NAT router devices 175. In particular, in this example, each of the host computing systems 105 executes a Virtual Machine ("VM") Communication Manager module 109, such as part of a hypervisor or other virtual machine monitor for the host computing system, with each of the Communication Manager modules 109 being used to manage at least some communications for the associated virtual machines 107 hosted on the physical computing system 105 on which the Communication Manager module 109 executes. For example, in some embodiments, the VM Communication Manager modules 109 each manage outgoing communications 174 sent from their associated virtual machine computing nodes 107 to external computing systems, while the NAT router devices 175 manage incoming communications 172 to the private network from external computing systems (e.g., in a manner similar to that previously described with respect to FIG. 1A).

In some embodiments, some or all of the computing nodes of the private network may be standalone computing systems that do not host any virtual machines (e.g., computing systems 155 of FIG. 1B), and in some embodiments some or all of the computing nodes of the private network may be virtual machine computing nodes. When non-host standalone computing system nodes such as computing systems 155 are present, outgoing communications from such computing nodes may similarly be managed by an associated Communication Manager module proximate to the managed computing nodes. For example, with respect to FIG. 1B, a computing device 150 has access to communications to and from the computing systems 155 (e.g., by acting as a proxy device or firewall), and in this example executes a Communication Manager module (not shown) to manage outgoing communications from the computing systems 155 in a manner similar to that of the VM Communication Manager modules 109. A computing system or device 105 or 150 that executes a Communication Manager module is referred to as a Communication Manager device herein, and may perform at least some functionality of a network address translation device.

As one illustrative example of use of a Communication Manager module, consider a situation in which internal virtual machine computing node 107*a*1 wants to send an outgoing communication (not shown) to external computing system 145*b*. If so, computing node 107*a*1 creates an outgoing communication that includes external computing system 145*b*'s public network address as the destination network address for the communication and that includes computing node 107*a*1's private network address as the source network address for the communication. The computing node 107a1 then initiates sending of the communication to external computing system 145b, but before the communication leaves the computing system 105a, the Communication Manager module 109a intercepts the communication (e.g., in at least some embodiments, without computing node 107a1 being aware of the interception or even of the existence of the Communication Manager module 109a). The Communication Manager module 109a then performs NAT-related functionality for the outgoing communication in a manner similar to that described for the NAT router device 175 of FIG. 1A for the example outgoing communication sent by internal computing system 153a. In particular, the Communication Manager module 109a temporarily maps one of the representative public network addresses for the private network to computing node 107a1, and rewrites or otherwise modifies the outgoing communication to replace the private network address for the source network address with the mapped representative public network address. The Communication Manager module 109a then send the modified outgoing communication to the destination external computing system 145b, by first forwarding the modified outgoing communication over the interconnection network 120 via the switch 115a. In this example embodiment, the interconnection network 120 uses the public destination network address to route the outgoing communication to the global internet 135 as one of the communications 174, without the outgoing communication being handled by any of the NAT router devices 175.

In addition, in at least some embodiments, the Communication Manager module 109a may update mapping information (not shown) that is locally maintained to reflect the temporary mapping, and may further in some such embodiments update one or more of the NAT router devices 175 in a similar manner, as discussed in greater detail below. Thus, if virtual machine computing node 107a1 later sends one or more additional outgoing communications to external computing system 145b (e.g., such as part of an ongoing communication session, and/or such as within a time period during which the temporary mapping remains in effect), the Communication Manager module 109a may similarly use the temporary mapping information to translate the private network address of computing node 107a1 to that same mapped representative public network address. In addition, if external computing system 145b later responds to the modified outgoing communication by sending a response incoming communication (not shown) that uses computing node 107a1's mapped representative public network address as the destination network address for the response incoming communication, the response incoming communication will be directed over the global internet 135 to one of the NAT router devices 175 as an incoming communication 172. That NAT router device 175 may then perform processing similar to that described with respect to FIG. 1A for the response incoming communication from external computing system 145b, including to use the mapping information to translate the mapped representative public network address into the private network address of computing node 107a1, modify the destination network address of the response incoming communication from the mapped representative public network address to that private network address, and forward the modified incoming communication to computing node 107a1 via the interconnection network 120. In some such embodiments, the modified response incoming communication will be provided to the computing node 107a1 without any handling of the modified response incoming communication by the Communication Manager module 109a, or with the Communication Manager module 109a merely receiving and forwarding the modified response incoming communication to computing node 107a1 without taking any further action. In other embodiments, the Communication Manager module 109a may take additional actions of one or more types with respect to such incoming communications to virtual machine computing nodes 107, such as after the NAT router devices 175 forward such incoming communications to the Communication Manager module 109a.

In addition, in some embodiments, multiple NAT router devices 175 may be used to manage multiple representative public network addresses for the private network, such as with each NAT router device 175 being associated with a subset of one or more of the multiple representative public network addresses. In such embodiments, an incoming communication to one of the representative public network addresses is forwarded to and handled by the NAT router device 175 to which that representative public network address is associated. If so, one or more optional load balancer devices 170 may not be used, since incoming communications will automatically be distributed among the multiple NAT router devices 175 based on the representative public network addresses used for the communications. In addition, in such embodiments, if a Communication Manager module maps an outgoing communication to one of the multiple representative public network addresses, only the one or more NAT router devices 175 to which that representative public network address is associated may be updated with the mapping information, resulting in less coordination between Communication Manager devices and NAT router devices.

In such embodiments, each Communication Manager module may operate independently of other Communication Manager modules, such as to not store mapping information generated by other Communication Manager modules unless such information is used by the Communication Manager modules to maintain a unique current mapping for each representative public network address (and optionally port number) by not reusing information that is part of an existing mapping. In other embodiments, such coordination between Communication Manager modules may not be used, such as if different Communication Manager modules use different representative public network addresses and/or port numbers, thus preventing possible overlap between mappings generated by multiple Communication Manager modules. Furthermore, since each NAT router device 175 supports fewer representative public network addresses in such embodiments with an associated subset of one or more representative public network addresses, the amount of mapping information used by a NAT router device may be less. In addition, as described with respect to FIG. 1A, in at least some such embodiments, one or more of the internal computing nodes of the private network may each be permanently or otherwise exclusively mapped to use one of the representative public network addresses.

As previously noted, in at least some embodiments, the computing nodes for which communications are managed may be physical computing systems and/or may be virtual machines that are each hosted on one or more physical computing systems, and the communications may include transmissions of data (e.g., messages, packets, frames, streams, etc.) in various formats. Furthermore, in at least some embodiments, at least some of the computing nodes may be part of a program execution service (or "PES") that executes multiple programs on behalf of multiple customers or other users of the service, such as a program execution service that uses multiple computing systems on one or more private or public physical networks (e.g., multiple physical computing systems within a data center). For example, in at least some such embodiments, customers may provide programs to be executed to the execution service, and may reserve execution time and other resources on physical or virtual hardware facilities provided by the execution service. In at least some such embodiments, one or more system manager modules for the program execution service may track and/or manage which computing nodes execute programs on behalf of a customer or other entity, such as optional system manager module 110 of FIG. 1B (e.g., with each such system manager module executed as part of the private network, such as via a hosted virtual machine or a standalone physical computing system, or instead externally to the private network). Additional details related to program execution services are included below. In addition, in at least some embodiments, one or more such system manager modules may optionally be used for other purposes, such as to facilitate a variety of types of configuration of the Communication Manager modules and/or NAT router devices (e.g., particular private network computing nodes to be associated with particular Communication Manager modules, particular representative public network addresses to be associated with particular NAT router devices, etc.). In other embodiments, the described techniques may be used in situations other than with a program execution service, such as with any other use of a private network on behalf of one or more entities (e.g., to support one or more private networks for different parts of a business or other organization).

Figure 2:
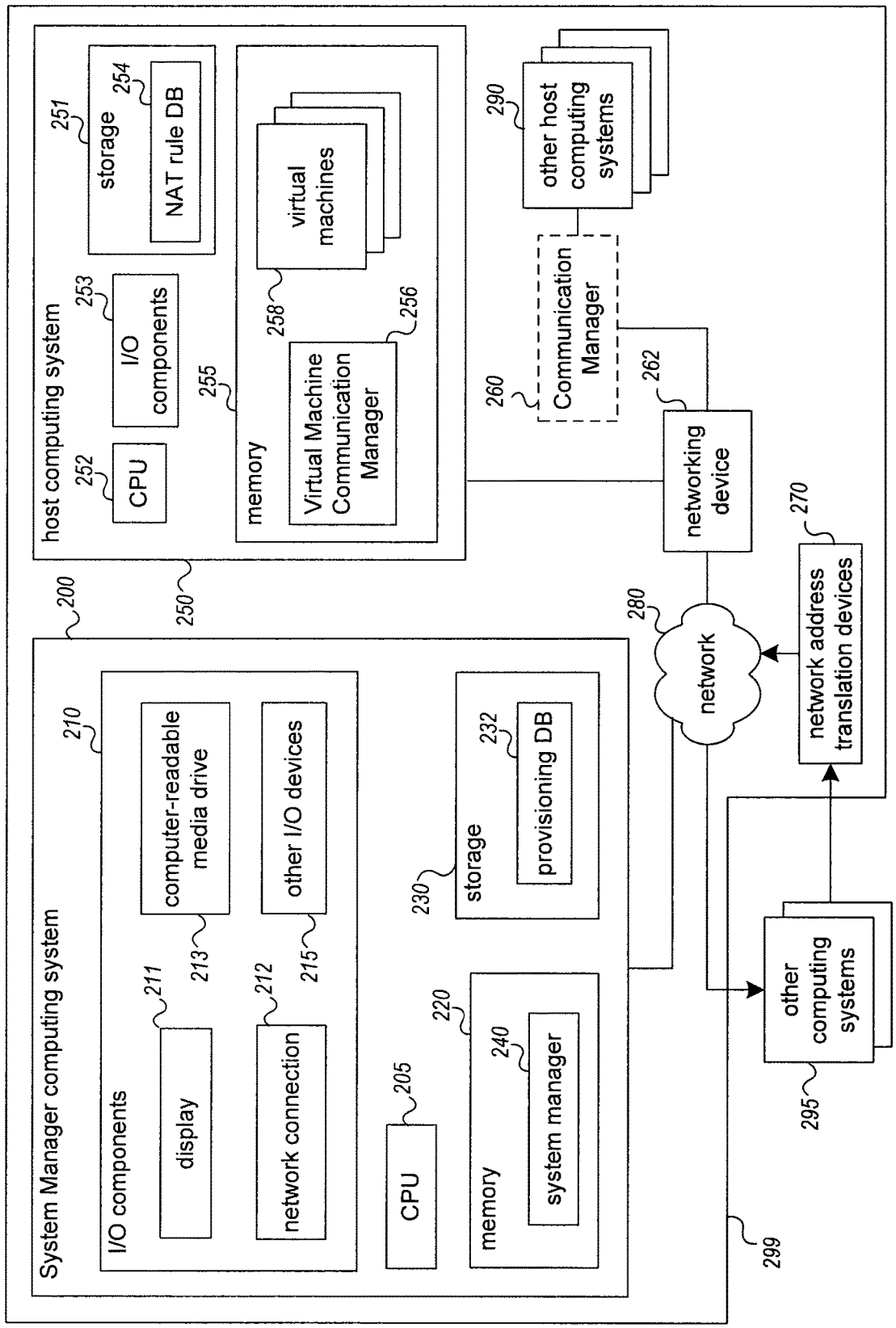
FIG. 2 is a block diagram illustrating an example embodiment of a system for managing communications to and from computing nodes.

FIG. 2 is a block diagram illustrating an example embodiment of a system for managing communications to and from computing nodes. In particular, FIG. 2 illustrates a group 299 of networked computing systems, such as may be part of a data center or other group of co-located computing systems, or may otherwise be computing nodes of a private network. In some embodiments, some or all of the computing systems of the group 299 may be used by a program execution service that executes programs on behalf of customers or other entities, as described in greater detail elsewhere.

The illustrated group 299 includes a system manager computing system 200, a host computing system 250 capable of executing one or more virtual machines, other computing systems 290 (e.g., host computing systems that execute virtual machines in a manner similar to host computing system 250 and/or standalone computing systems that do not host virtual machines), and an optional Communication Manager device 260 that manages communications from some or all of the computing systems 290. The system manager computing system 200 and computing systems 250 and 290 are connected to one another via an internal network 280, which includes a networking device 262 and other networking devices (not shown). The network 280 may further provide access to external networks (not shown) and/or external systems, such as computing systems 295. In the illustrated example, the networking device 262 provides a gateway between the network 280 and host computing systems 250 and 290, and may be, for example, a router or a bridge.

In particular, in this illustrated example, at least some incoming communications from the computing systems 295 pass through one or more network address translation devices 270, such as to translate public network addresses for the incoming communications to corresponding private network addresses of computing nodes internal to the group 299, In addition, in this illustrated example, at least some outgoing communications from the computing nodes internal to the group 299 are forwarded to the computing system 295 without passing through the network address translation devices 270, such as after being handled by a Communication Manager module that translates private network addresses of the sending computing nodes internal to the group 299 to corresponding public network addresses (e.g., representative public network addresses used to represent the internal computing nodes of the group 299).

In the illustrated example, the system manager computing system 200 functions to manage the configuration of Communication Manager modules and/or network address translation devices within the group 299, as well as to optionally provide other functions related to the provisioning, initialization, and execution of programs on computing nodes. The illustrated system manager computing system 200 includes a CPU 205, various I/O components 210, storage 230, and memory 220. The I/O components include a display 211, network connection 212, computer-readable media drive 213, and other I/O devices 215 (e.g., a mouse, keyboard, etc.).

The host computing system 250 functions to host one or more virtual machines, such as to operate as computing nodes that are part of a private network. The host computing system 250 includes a CPU 252, various I/O components 253, storage 251, and memory 255. A virtual machine Communication Manager module 256 and one or more virtual machines 258 are executing in the memory 255, with the module 256 managing at least some outgoing communications for the associated virtual machine computing nodes 258 as described in greater detail elsewhere. The Communication Manager module 256 maintains various network address translation mapping information 254 on storage related to the computing nodes 258, such as NAT translation rules. The structure of the other host computing systems 290 may be similar to that of host computing system 250, or instead some or all of the host computing systems 250 and 290 may act directly as computing nodes by executing programs without using hosted virtual machines. In a typical arrangement, the group 299 may include hundreds or thousands of host computing systems such as those illustrated here, optionally organized into a large number of distinct physical networks.

In the illustrated embodiment, a system manager module 240 is executing in memory 220 of the computing system 200, although in other embodiments may not be used. In some embodiments, the system manager 240 may receive an indication of one or more programs to be executed as part of one or more virtual machine computing nodes on host computing system 250 or otherwise as one or more computing nodes using one of the host computing systems 290, and in some situations may select the computing node(s) that will execute the program(s). In some cases, information about the various computing nodes and their executing programs may be provided by the provisioning database 232, which the module 240 maintains to store information related to the physical and virtual resources (e.g., networking, hardware, etc.) associated with various customers and/or executing programs and computing nodes. The system manager module 240 then initiates execution of the program(s) on the computing node(s), and optionally provides information to the Communication Manager modules associated with those computing nodes regarding private network addresses of the computing nodes and/or information about representative public network addresses to which those private network addresses may be mapped. In other embodiments, the execution of programs on computing nodes may be initiated in other manners, and the system manager module 240 may instead merely receive and maintain information about those computing nodes, programs, associated entities and private networks.

As discussed in greater detail elsewhere, the Communication Manager modules 256 and 260 (and other Communication Manager modules, not shown, that manage other associated computing nodes, not shown) and the network address translation devices 270 may interact in various ways to manage communications for computing nodes. Such interactions may, for example, enable the computing nodes 258 and/or other computing nodes to inter-communicate over one or more internal networks for the group 299, such as by assigning private network addresses to the computing nodes, and sharing information about mapped representative public network addresses that correspond to private network addresses.

It will be appreciated that computing systems 200, 250, 290, and 295, and networking device 262 and network address translation devices 270, are merely illustrative and are not intended to limit the scope of the present invention. For example, computing systems 200 and/or 250 may be connected to other devices that are not illustrated, including through one or more networks external to the group 299, such as the Internet or via the World Wide Web ("Web"). More generally, a computing node or other computing system may comprise any combination of hardware or software that can interact and perform the described types of functionality, including without limitation desktop or other computers, database servers, network storage devices and other network devices, PDAs, cellphones, wireless phones, pagers, electronic organizers, Internet appliances, television-based systems (e.g., using set-top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

It will also be appreciated that, while various items are illustrated as being stored in memory or on storage while being used, these items or portions of them may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other manners, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 3:
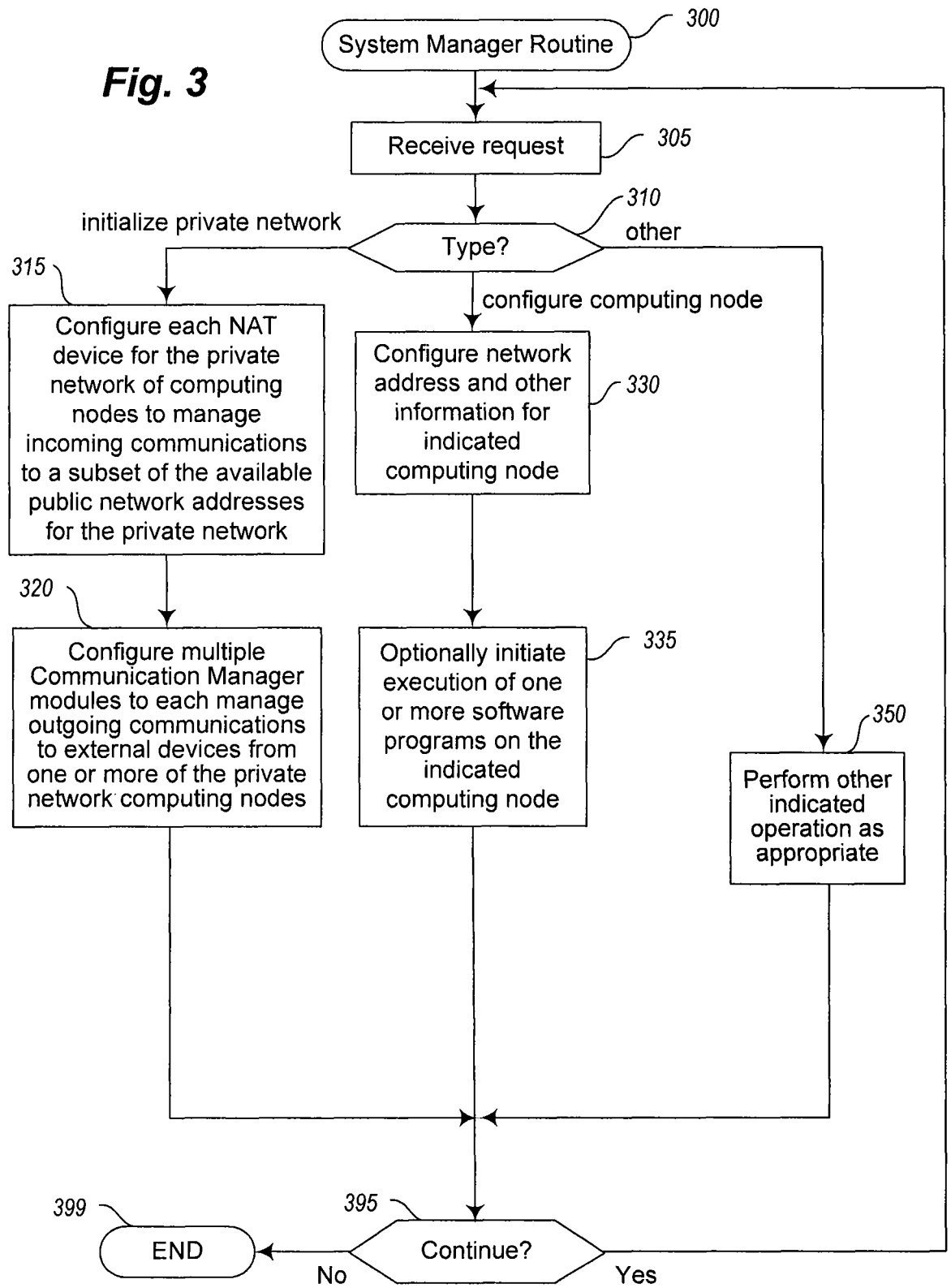
FIG. 3 illustrates a flow diagram of an example embodiment of a System Manager routine.

FIG. 3 is a flowchart of an example embodiment of a System Manager routine 300. The routine may be provided by, for example, execution of the system manager module 110 of FIG. 1B and/or the system manager module 240 of FIG. 2, such as to assist in managing operations of multiple computing nodes that are part of one or more private networks, as well as to perform other types of management operations in some situations. In at least some embodiments, the routine may be provided as part of a system that manages operations for multiple different entities, such as part of a program execution service that executes programs on distributed computing nodes for multiple customers, with the operations managed so as to enable the provision of NAT-related functionality in an asymmetric and distributed manner.

In the illustrated embodiment, the routine begins at block 305, where a request is received. The routine continues to block 310 to determine the type of request. If it is determined that the type of request is to configure network address translation devices and/or communication manager devices, such as to initialize the providing of NAT-related functionality for a private network, the routine continues to block 315. In block 315, the routine configures each of one or more NAT devices for the private network to enable the NAT devices to manage incoming communications for at least a subset of representative public network addresses for the private network. In block 320, the routine then configures each of multiple communication manager devices to manage outgoing communications for one or more computing nodes of the private network that are associated with the communication manager device. In other embodiments, the configuration of such network address translation devices and/or communication manager devices may be performed in other manners or at other times, such as to periodically update or otherwise maintain NAT devices and/or communication manager devices over time (e.g., to reflect changes in which private network addresses and/or representative public network addresses are assigned to particular computing nodes or groups of computing nodes).

If it is instead determined in block 310 that the type of received request is a request to configure a computing node of the private network, the routine continues instead to block 330 to configure network address and other information for the computing node, such as to assign a private network address to the computing node, to associate the computing node with a particular communication manager device, to associate the computing node with a particular indicated entity (e.g., if that computing node is executing or is to execute one or more programs on behalf of that entity), etc. The routine then continues to block 335 to optionally initiate execution of one or more software programs on the indicated computing node, such as for a limited time and/or on behalf of a customer of a program execution service. As discussed in greater detail elsewhere, in some embodiments one or more of the computing nodes may each be a virtual machine that is hosted by one or more physical computing systems.

If it is instead determined in block 310 that the received request is of another type, the routine continues instead to block 350 to perform another indicated operation as appropriate. For example, in some embodiments, the routine may receive requests to update stored information about particular computing nodes, such as if a particular computing node was previously associated with a particular entity and/or private network address but that association ends (e.g., if one or more programs being executed for that entity on that computing node are terminated, if the private network address and/or representative public network address associated with a particular computing node is modified, etc.)— such updating may include, for example, discarding network address translation rules or other mapping information associated with a computing node after information for the computing node changes, and/or initiating similar actions by communication manager modules by sending corresponding instructions or other information to those communication manager modules. Instructions and other information (e.g., updates regarding a private network address and/or representative public network address associated with a particular computing node) may be provided between a system manager module and a communication manager module in various manners, such as by the system manager module pushing the information to the communication manager module (e.g., periodically, when initiated by changes to relevant information, etc.) and/or by the communication manager module pulling or otherwise accessing the information from the system manager module (e.g., periodically, when initiated by possible use of the information, etc.). The routine may also perform a variety of other actions related to managing a system of multiple computing nodes, as discussed in greater detail elsewhere. In addition, while not illustrated here, in other embodiments the routine may at times perform actions of other types, such as to perform occasional housekeeping operations to review and update stored information as appropriate, such as after predefined periods of time have expired.

After blocks 320, 335, and 350, the routine continues to block 395 to determine whether to continue. If so, the routine returns to block 305, and if not continues to block 399 and ends.

Figure 4:
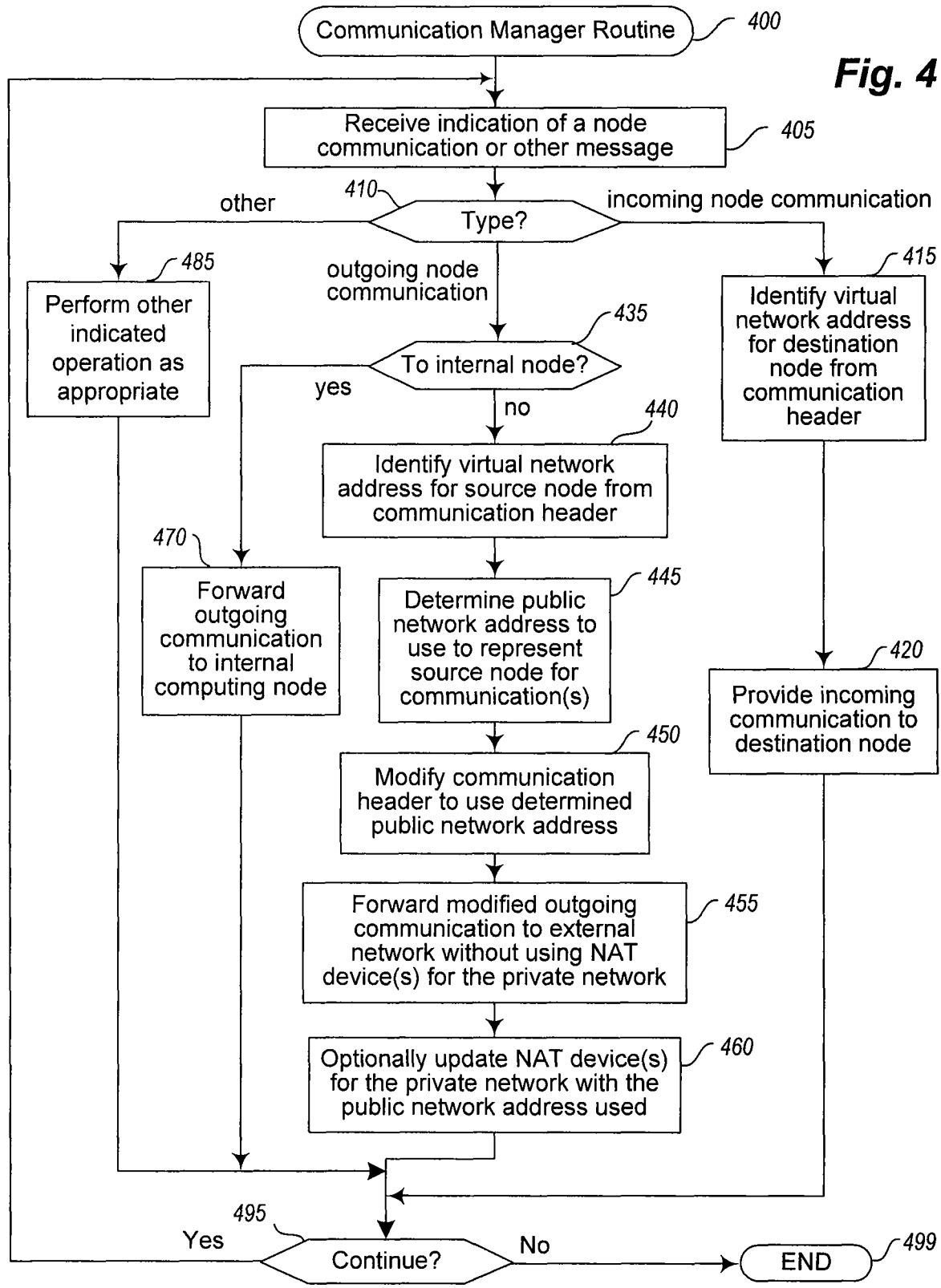
FIG. 4 illustrates a flow diagram of an example embodiment of a Communication Manager routine.

FIG. 4 is a flow diagram of an example embodiment of a Communication Manager routine 400. The routine may be provided by, for example, execution of the Communication Manager modules 109 and/or 150 of FIG. 1B, and/or the Communication Manager modules 256 and/or 260 of FIG. 2, such as to manage communications from an associated group of one or more computing nodes in order to provide NAT-related functionality for a private network.

The routine beings at block 405, where an indication is received of a node communication or other message. The routine continues to block 410 to determine the type of communication or other message and proceed accordingly. If it is determined in block 410 that the message is an incoming communication intended for a computing node associated with the routine, the routine continues to block 415 in the illustrated embodiment to determine the destination computing node based on a private network address for the destination computing node that is indicated as the destination network address for the incoming communication, and in block 420 provides the incoming communication to the destination computing node. In other embodiments, the routine may not receive such incoming communications, or may handle such incoming communications in other manners (e.g., if so directed by a network address translation device that forwarded the incoming communication to the routine). For example, in other embodiments, various additional types of processing may be performed for incoming node communications, such as to verify that the communications are valid or otherwise authorized in various ways (e.g., to verify that the sending computing node is authorized to and/or interested in receiving communications to the destination computing node, such as based on being associated with the same entity, based on the sending and destination computing nodes being associated with different entities that are authorized to intercommunicate, based on the type of communication or other information specific to the communication, etc.).

If it is instead determined in block 410 that the message is an outgoing communication from a computing node associated with the routine, the routine continues to block 435 to determine whether the outgoing communication is intended for an internal computing node of the private network (e.g., based on the destination network address specified for the outgoing communication being an internal private network address for the private network). If so, the routine continues to block 470 to forward the outgoing communication to the destination internal computing node, such as without modifying the outgoing communication. Otherwise, the routine continues instead to block 440 to determine the private network address for the source computing node that sent the outgoing communication, such as based on the source network address specified for the outgoing communication. In block 445, the routine then translates the private network address to a corresponding representative public network address for the private network or otherwise determines the corresponding representative public network address (e.g., by interacting with a NAT device and/or a system manager module). In block 450, the routine then modifies the header of the outgoing communication to use the corresponding representative public network address for the private network address, and in block 455 forwards the modified outgoing communication to the destination external computing system via one or more external networks, such as without using any of the NAT devices for the private network.

In other embodiments and situations, the routine may operate in other manners with respect to block 470 and blocks 440-455, such as if the intended destination of an outgoing communication is an internal computing node of the private network, but that destination is indicated in the outgoing communication using a representative public network address for that destination internal computing node rather than the internal private network address for that destination internal computing node. If so, the outgoing communication may be handled in various manners in various embodiments. For example, in some embodiments, the outgoing communication may be handled in a manner similar to that of other outgoing node communications as previously described with respect to blocks 440-455, such as by forwarding the outgoing communication with the modified source public network address to an external network without using the NAT devices for the private network. Such forwarded communications may then be re-directed back to one of the NAT devices of the private network as an incoming communication, and handled in a manner similar to any other incoming communication to the private network, as described in greater detail elsewhere. In other embodiments, the outgoing communication may be handled in a manner similar to that of other outgoing node communications as previously described with respect to blocks 440-455, but will be forwarded to one of the NAT devices for the private network rather than to the external network without using the NAT devices. In such embodiments, the NAT device may re-direct the outgoing communication back into the private network for delivery to the destination internal computing node without the outgoing communication reaching an external network, such as after modifying the communication to use the internal private network address for the destination internal computing node as the destination address for the communication. In yet other embodiments, the routine 400 may perform processing in a manner similar to blocks 440-455 to modify the outgoing communication to use the internal private network address for the destination internal computing node as the destination address for the communication (e.g., in a manner similar to a NAT device), and then forward the outgoing communication directly to the destination internal computing node over the private network without using any of the NAT devices and without the outgoing communication leaving the private network.

After block 455, the routine then in block 460 optionally updates stored mapping information to reflect the corresponding representative public network address for the private network address, such as by updating one or more of the NAT devices with which the corresponding representative public network address is associated. Such updating may be performed in various manners in various embodiments, as discussed in greater detail elsewhere, including by coordinating with a system manager module, or instead in a distributed peer-to-peer manner. While not illustrated here, in other embodiments various additional types of processing may be performed for outgoing node communications, such as to verify that the communications are valid or otherwise authorized in various ways (e.g., to verify that the sending computing node is authorized to send communications to the destination computing node, such as based on being associated with the same entity, based on the sending and destination computing nodes being associated with different entities that are authorized to inter-communicate, based on the type of communication or other information specific to the communication, etc.).

If it is instead determined in block 410 that a message of another type is received, the routine continues to block 485 to perform another indicated operation as appropriate, such as to store information about particular computing nodes associated with the routine, to store information about representative public network addresses for the private network, to update previously mapped or stored information to reflect changes with respect to computing nodes that are being managed or to remote computing nodes, etc.

After blocks 420, 460, 470, or 485, the routine continues to block 495 to determine whether to continue. If so, the routine returns to block 405, and if not continues to block 499 and ends.

In addition, various embodiments may provide mechanisms for customer users and other entities to interact with an embodiment of the system manager module for purpose of configuring computing nodes and their communications. For example, some embodiments may provide an interactive console (e.g. a client application program providing an interactive user interface, a Web browser-based interface, etc.) from which users can access functions related to the operation and management of hosted applications (e.g., the creation or modification of user accounts; the provision of new applications; the initiation, termination, or monitoring of hosted applications; the assignment of applications to groups; the reservation of time or other system resources; etc.). In addition, some embodiments may provide an API ("application programming interface") that allows other computing systems and programs to programmatically invoke at least some of the described functionality. Such APIs may be provided by libraries or class interfaces (e.g., to be invoked by programs written in C, C++, or Java) and/or network service protocols such as via Web services. Additional details related to the operation of example embodiments of a program execution service with which the described techniques may be used are available in U.S. application Ser. No. 11/394,595, filed Mar. 31, 2006 and entitled "Managing Communications Between Computing Nodes;" U.S. application Ser. No. 11/692,038, filed Mar. 27, 2007 and entitled "Configuring Intercommunications Between Computing Nodes;" and U.S. application Ser. No. 12/060,074, filed Mar. 31, 2008 and entitled "Configuring Communications Between Computing Nodes;" each of which is incorporated herein by reference in its entirety.

It will also be appreciated that, although in some embodiments the described techniques are employed in the context of a data center housing multiple physical machines hosting virtual machines and/or in the context of a program execution service, other implementation scenarios are also possible. For example, the described techniques may be employed in the context an organization-wide network or networks operated by a business or other institution (e.g. university) for the benefit of its employees and/or members. In addition, example embodiments may be employed within a data center or other context for a variety of purposes.

It will also be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. One or more non-transitory computer-readable media having stored contents that cause one or more computing devices to:

implement at least a portion of a network-accessible service configured to provide a first computer network to a client, wherein the first computer network is provided as a virtual network of virtual machines managed by one or more hypervisors running on one or more server computers of the network-accessible service and configured according to configuration information specified by the client;

configure one or more network address translation devices located at a boundary between the first computer network and one or more external networks to translate network addresses of incoming communications from the one or more external networks that are directed to individual ones of the virtual machines in the first computer network, wherein individual ones of the virtual machines have respective private network addresses in the first computer network, and wherein the network addresses of the incoming communications are used in the one or more external networks and are translated to the private network addresses used by the virtual machines in the first computer network; and configure a hypervisor running on a first server computer of the one or more server computers running the one or more hypervisors managing the virtual machines within the first computer network, the first server computer being separate from the one or more network address translation devices and storing network addresses for a hosted virtual machine and for one or more destinations in the one or more external networks, wherein the configuration causes the hypervisor to intercept outgoing communications from the hosted virtual machine to one or more destinations in the one or more external networks and translate network addresses in at least some of the outgoing communications to other network addresses used in the one or more external networks.

2. The one or more non-transitory computer-readable media of claim 1 wherein the configuring of the first server computer includes configuring software on the first server computer to use the stored network addresses as part of sending at least some additional outgoing communications from the hosted virtual machines to other virtual machines provided on other server computers.

3. The one or more non-transitory computer-readable media of claim 1, wherein the configuring of the first server computer includes storing information on the first server computer that includes at least some of the configuration information, and wherein the stored contents further cause the one or more computers to configure the first server computer to use the stored information as part of managing the at least some outgoing communications and to perform the translating of the network addresses in the at least some outgoing communications to the other network addresses used in the one or more external networks without using any network address translation functionality provided by the configured one or more network address translation devices.

4. The one or more non-transitory computer-readable media of claim 1 wherein the translating by the first server computer of the network addresses in the at least some outgoing communications to the other network addresses used in the one or more external networks includes generating a new mapping of one of the private network addresses of the first computer network to one of the other network addresses used in the one or more external networks, and wherein the stored contents include software instructions that, when executed, further cause the one or more computers to provide information to at least one of the one or more network address translation devices about the new mapping for use in managing further incoming communications.

5. The one or more non-transitory computer-readable media of claim 1 wherein the first server computer is internal to the first computer network, and wherein the stored contents further configure the first server computer to forward the at least some outgoing communications to the one or more external networks for delivery to the other network addresses that result from the translating of the network addresses in the at least some outgoing communications.

6. The one or more non-transitory computer-readable media of claim 5 wherein the forwarding of the at least some outgoing communications to the one or more external networks includes forwarding, by the first server computer, the at least some outgoing communications to the one or more external networks without any interactions with the configured one or more network address translation devices.

7. The one or more non-transitory computer-readable media of claim 5 wherein the boundary is at an edge of the first computer network and the configured one or more network address translation devices connect the first computer network and the one or more external networks, and wherein the stored contents further cause the one or more computers to forward the incoming communications to destinations in the first computer network indicated by the other private network addresses that result from the translating of the network addresses in the incoming communications.

8. A computer-implemented method, comprising:

providing, by one or more computing system of a network-accessible service, a virtual network of virtual machines as a first computer network for a client according to configuration information specified by the client, wherein the virtual machines are managed by one or more hypervisors on one or more server devices of the network-accessible service;

configuring, by the one or more computing systems, one or more network address translation devices to manage incoming communications directed to the virtual machines acting as computing nodes in the first computer network, wherein the incoming communications are received from one or more other networks external to the first computer network, wherein the management of the incoming communications includes using network address translation functionality of the configured one or more network address translation devices to translate network addresses in the incoming communications to private network addresses corresponding to individual ones of the virtual machines in the first computer network, and wherein the one or more network address translation devices are located at an edge of the first computer network to manage a connection between the first computer network and the one or more other networks; and configuring, by the one or more computing systems, the one or more hypervisors managing the virtual machines within the first computer network to manage outgoing communications from hosted virtual machines of the one or more server devices to one or more destinations in the one or more other networks, wherein the configuration causes the one or more hypervisors to perform:

storing network addresses for the computing nodes and for the one or more destinations in the one or more other networks;

intercepting at least some of the outgoing communications from the virtual machine to the one or more destinations in the one or more other networks; and translating private network addresses in the outgoing communications to other network addresses used by the one or more other networks without using the network address translation functionality of the configured one or more network address translation devices, and wherein the one or more server devices are internal to the first computer network and not located at the edge of the first computer network and are separate from the one or more network address translation devices.

9. The computer-implemented method of claim 8 wherein the configuring of the one or more server devices includes configuring software on the server devices that is for use in managing virtual machines hosted on the one or more server devices.

10. The computer-implemented method of claim 8 further comprising using the stored network addresses for the multiple computing nodes on one of the server devices as part of translating network addresses for at least some outgoing communications from a virtual machine hosted on the one server device to other computing nodes of the first computer network provided on other server devices.

11. The computer-implemented method of claim 8, wherein the configuring of the one or more server devices includes storing information on the one or more server devices that includes at least some of the configuration information, and wherein the method further comprises managing the at least some outgoing communications by using the stored information.

12. The computer-implemented method of claim 8 wherein storing of the network addresses on the one or more server devices includes storing mapping information on the one or more server devices that associates one or more of the private network addresses used by the first computer network to one or more of the other network addresses used by the one or more other networks, and wherein the method further comprises managing the at least some outgoing communications by using the stored mapping information.

13. The computer-implemented method of claim 8 further comprising, as part of the translating by the configured one or more server devices of the private network addresses to the other network addresses used in the one or more other networks, generating a new mapping of one of the private network addresses to one of the other network addresses, and providing information to at least one of the one or more network address translation devices about the new mapping for use in managing further incoming communications.

14. The computer-implemented method of claim 8 further comprising managing the at least some outgoing communications by forwarding the at least some outgoing communications to the one or more other networks for delivery to the other network addresses from the translating of the private network addresses in the at least some outgoing communications.

15. The computer-implemented method of claim 14 wherein the forwarding of the at least some outgoing communications to the one or more other networks includes forwarding, by the configured one or more server devices, the at least some outgoing communications to the one or more other networks without the forwarded at least some outgoing communications passing through any of the configured one or more network address translation devices and without any interactions with the configured one or more network address translation devices.

16. The computer-implemented method of claim 14 further comprising managing the incoming communications by forwarding the incoming communications to destinations in the first computer network indicated by the other private network addresses from the translating of the network addresses in the incoming communications.

17. The computer-implemented method of claim 8 wherein the other network addresses used in the one or more other networks are public Internet Protocol (IP) addresses available for routing communications over public networks, and wherein the private network addresses used in the first computer network are IP addresses reserved for use with private networks.

18. A system, comprising:
one or more hardware processors of a server computer system; and
one or more memories with stored instructions that, when executed by at least one of the one or more hardware processors, cause the server computer system to:
host, using computing resources of the server computer system, a virtual machine that executes one or more software programs for a customer of a network-accessible service, wherein the virtual machine is managed by a hypervisor running on the server computer system and configured as a computing node in a virtual network of virtual machines provided by the network-accessible service;
receive, from the network-accessible service, mapping information that associates external network addresses for one or more networks external to the network-accessible service with internal network addresses used by the network-accessible service, wherein the internal network addresses include a first internal network address in the virtual network associated with the virtual machine;
receive, from one or more network address translation devices of the network-accessible service, one or more communications sent to the virtual machine from one or more computer systems in the one or more networks external to the network-accessible service, wherein the received one or more communications include the first internal network address based on the one or more network address translation devices modifying the communications to add the first internal network address before forwarding the communications to the server computer system;
intercept, at the hypervisor, one or more outgoing communications sent from the virtual machine and directed to at least one computer system in the one or more networks external to the network-accessible service;
modify, by the hypervisor and using the mapping information, the one or more outgoing communications, wherein the modification includes translating one or more of the internal network addresses in each of the outgoing communications to one or more of the external network addresses.

19. The system of claim 18 wherein the stored instructions further cause the server computer system to perform the translating of the one or more internal network addresses in each of the outgoing communications to the one or more external network addresses without using any functionality of the one or more network address translation devices, and to forward the modified one or more outgoing communications to the at least one computer system in the one or more networks external to the network-accessible service.

20. The system of claim 18 wherein the server computer system is one of a plurality of computer systems operated by the network-accessible service on behalf of customers of the on line service, wherein the one or more network address translation devices are operated by the network-accessible service to connect the plurality of computer systems to the one or more networks external to the network-accessible service, and wherein the system further comprises the one or more network address translation devices.

\* \* \* \* \*